(12) United States Patent
Gissler et al.

(10) Patent No.: US 11,767,730 B2
(45) Date of Patent: Sep. 26, 2023

(54) METHOD AND SYSTEM FOR CREATING METAL-TO-METAL

(71) Applicant: HALLIBURTON ENERGY SERVICES, INC., Houston, TX (US)

(72) Inventors: Robert William Gissler, Spring, TX (US); Clint Adam Brown, Houston, TX (US); Gregory Scott Cunningham, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 312 days.

(21) Appl. No.: 16/614,638

(22) PCT Filed: Dec. 26, 2018

(86) PCT No.: PCT/US2018/067517
§ 371 (c)(1),
(2) Date: Nov. 18, 2019

(87) PCT Pub. No.: WO2020/139322
PCT Pub. Date: Jul. 2, 2020

(65) Prior Publication Data
US 2021/0332662 A1    Oct. 28, 2021

(51) Int. Cl.
*E21B 33/12* (2006.01)
*F16J 15/06* (2006.01)
*F16J 15/08* (2006.01)

(52) U.S. Cl.
CPC ......... *E21B 33/1212* (2013.01); *F16J 15/068* (2013.01); *F16J 15/0806* (2013.01)

(58) Field of Classification Search
CPC ... F16J 15/0806; F16J 15/068; E21B 33/1212
See application file for complete search history.

(56) References Cited

U.S. PATENT DOCUMENTS

| | | | |
|---|---|---|---|
| 4,281,841 A | 8/1981 | Kim et al. | |
| 4,445,694 A | 5/1984 | Flaherty | |
| 4,515,213 A * | 5/1985 | Rogen | E21B 33/1212 166/123 |

(Continued)

FOREIGN PATENT DOCUMENTS

| | | | | |
|---|---|---|---|---|
| JP | 58180872 A | * | 10/1983 | ........... F16J 15/0806 |
| JP | 59200869 A | * | 11/1984 | .............. F16L 23/20 |

(Continued)

OTHER PUBLICATIONS

Duerig, Melton, "Applications of Shape Memory in the USA", New Materials and Processes for the Future; pp. 195-200; 1989.

(Continued)

*Primary Examiner* — Eugene G Byrd
(74) *Attorney, Agent, or Firm* — NOVAK DRUCE CARROLL LLP

(57) ABSTRACT

A seal including a first metal component; a second metal component couplable with the first metal component; and a shape memory alloy having a first state and a second state, the first state and the second state being different in at least one dimension, wherein in response to an external stimulus, the shape memory alloy transitions in one or more dimension from the first state to the second state thereby forming at least one metal-to-metal seal.

20 Claims, 4 Drawing Sheets

(56) References Cited

U.S. PATENT DOCUMENTS

| | | | |
|---|---|---|---|
| 4,773,680 A | 9/1988 | Krumme | |
| 4,781,605 A | 11/1988 | Herubel et al. | |
| 5,058,936 A | 10/1991 | Kapgan et al. | |
| 5,226,683 A * | 7/1993 | Julien | F16L 23/20 |
| | | | 219/121.72 |
| 5,662,362 A | 9/1997 | Kapgan et al. | |
| 6,053,992 A | 4/2000 | Wu et al. | |
| 6,257,593 B1 * | 7/2001 | White | F16J 15/064 |
| | | | 277/630 |
| 6,435,519 B1 | 8/2002 | White | |
| 6,446,717 B1 * | 9/2002 | White | E21B 33/1212 |
| | | | 166/187 |
| 7,699,556 B2 | 4/2010 | Efremov | |
| 8,100,410 B2 * | 1/2012 | Alacqua | F16J 15/0806 |
| | | | 277/593 |
| 8,535,012 B2 | 9/2013 | Schlosser et al. | |
| 8,602,419 B2 | 12/2013 | Namuduri et al. | |
| 2002/0074742 A1 | 6/2002 | Quoiani | |
| 2007/0241516 A1 | 10/2007 | Efremov | |
| 2008/0042368 A1 | 2/2008 | Tewari | |
| 2008/0136180 A1 | 6/2008 | Dittmar | |
| 2008/0264647 A1 | 10/2008 | Li | |
| 2008/0296849 A1 * | 12/2008 | Alacqua | F16J 15/0893 |
| | | | 277/593 |
| 2009/0206552 A1 | 8/2009 | Nguy et al. | |
| 2010/0038072 A1 * | 2/2010 | Akselberg | E21B 33/1212 |
| | | | 166/118 |
| 2014/0138088 A1 * | 5/2014 | Ramon | E21B 33/12 |
| | | | 166/288 |
| 2015/0218889 A1 * | 8/2015 | Carroll | F16J 15/164 |
| | | | 148/563 |
| 2015/0353210 A1 * | 12/2015 | Litwinski | B64G 1/58 |
| | | | 244/171.7 |
| 2016/0123471 A1 * | 5/2016 | Roy | C22C 19/007 |
| | | | 277/336 |
| 2016/0333657 A1 * | 11/2016 | Zhao | E21B 33/1208 |
| 2017/0146163 A1 * | 5/2017 | Bandola | F16J 15/0806 |
| 2017/0204675 A1 | 7/2017 | Yu et al. | |

FOREIGN PATENT DOCUMENTS

| | | |
|---|---|---|
| WO | 9104433 A1 | 4/1991 |
| WO | 0138687 A2 | 5/2001 |

OTHER PUBLICATIONS

Wu, Ming H. et al., "Industrial Applications for Shape Memory Alloys", Proceedings of the International Conference on Shape Memory and Superelastic Technologies, Pacific Grove, California, p. 171-182 (2000).

Song, G. et al., "Applications of Shape Memory Alloys in Offshore Oil and Gas Industry: A Review", Earth and Space 2010: pp. 1551-1567; 2010.

International Search Report and Written Opinion; PCT Application No. PCT/US2018/067517; dated Sep. 19, 2019.

* cited by examiner

METHOD AND SYSTEM FOR CREATING METAL-TO-METAL

CROSS-REFERENCE TO RELATED APPLICATIONS

This application is a national stage entry of PCT/US2018/067517 filed Dec. 26, 2018, said application is expressly incorporated herein in its entirety.

FIELD

The present disclosure relates generally to metal-to-metal seals. In particular, the present disclosure relates to the use of shape memory material to create one or more metal-to-metal seals.

BACKGROUND

Metal-to-metal seals are frequently used in devices and tools which can be subjected to extreme temperatures, pressures, and caustic materials that can destroy or degrade other sealing materials, such as elastomeric seals. Such environments can include space, mechanics, robotics, hydraulics, oil and gas, and various other fields where tools can be subjected to extreme conditions. The metal-to-metal seals provide a stronger, more durable seal than softer materials; however, as they do not allow for sufficient elastic deformation they can be subject to failure if the seal suffers from a small fracture, scaling, or surface damage.

Installing metal-to-metal seals can be a delicate procedure. If the metal seal is damaged, fractured, or displaced during installation, the tool will not perform at peak efficiency. Tools used in downhole operations, for example in the oil and gas field, can require metal-to-metal seals that may be subjected to extreme temperatures and pressures downhole. Some tools can be modular in form and may require such seals at various points throughout the tool assembly. If the metal seals are damaged during the assembly or transportation of the downhole tool, the tools will not be able to perform properly when disposed downhole.

BRIEF DESCRIPTION OF THE DRAWINGS

Implementations of the present technology will now be described, by way of example only, with reference to the attached figures, wherein.

DETAILED DESCRIPTION

Figure 1:
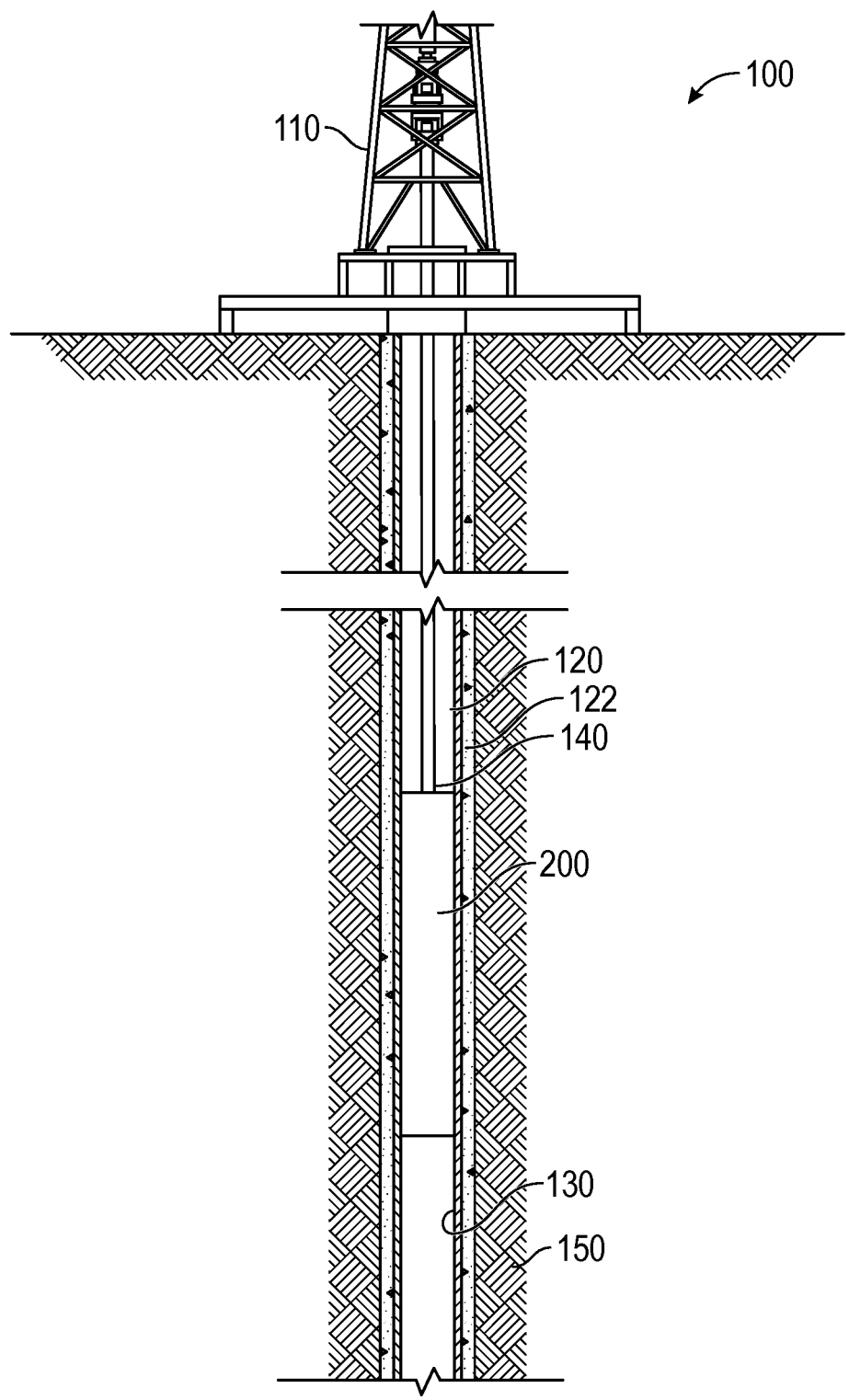
FIG. 1 is a diagram illustrating an exemplary environment for a downhole tool assembly encompassing one or more metal-to-metal seals.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is a method and system for creating one or more metal-to-metal seals compatible for use downhole using a shape memory material. The method can include a sealing material of any suitable shape memory material capable of withstanding the extreme temperatures and pressures which can be experienced in a downhole environment. Additionally, the tool encompassing the sealing material described herein can be designed such that there is no increased pressure experienced by the shape memory material. As such, the seal can include shape memory materials which are not capable of withstanding increased pressures. The shape memory material can be used to expand or contract in order to create one or more metal-to-metal seals, depending on the design of the tool assembly. The metal-to-metal seals described herein can be capable of withstanding extreme temperatures and pressures. The pressures with which the disclosed metal-to-metal seals can withstand can vary significantly based on the materials used. In at least one example the metal-to-metal seal can have a rating for significantly high pressures, including pressures in excess of 30,000 pounds per square inch (psi).

The metal-to-metal seals disclosed herein include high expansion seals using metal as a pressure barrier in order to produce a high-pressure seal that cannot be achieved by conventional elastomeric seals.

As used herein, the term "shape memory" refers to a material which can be deformed and returned to a predetermined shape when subjected to an external stimulus. Specifically, a shape memory material can include two states, an austenite, or rigid state, and a martensite, or softer, state. When subjected to external stimuli, shape memory materials can undergo a rearrangement of the crystalline structure of the material, allowing the material to take a predetermined form. External stimuli capable of causing crystalline rearrangement within the material can include, but are not limited to, changes in temperature or pressure, presence of an electric current, and/or sonic input. Properties associated with the shape memory material can be specifically selected based on the materials used to create the seal. For example, different pressure and temperature thresholds for the seal can be achieved by selecting certain materials, such as various metal alloys. Additionally, type and amount of external stimuli required to induce the crystalline change in the material can be determined based on the selected alloy.

The seals can include any shape memory material as described above. Various materials can be made into a shape memory material, including polymers, metal alloys, and hybrids of the two. Due to the extreme conditions experienced downhole, shape memory metal alloys provide a stronger, more effective seal within a downhole tool assembly. Shape memory alloys are generally stronger than shape memory polymers and are therefore able to withstand higher temperatures and pressures. The term "alloy" as used herein refers to a metal made by combining two or more metallic elements. Shape memory alloys compatible with the present seal can include, but are not limited to, metal alloys comprising nickel, titanium, copper, aluminum, iron, manganese, silicon, zinc, niobium, and other suitable metal alloys. Specific alloys suitable for creating the metal-to-metal seals described herein can include, but are not limited to, binary and ternary nickel-titanium alloys, copper-aluminum-nickel alloys, iron-manganese-silicon alloys, copper-zinc-aluminum alloys, and the like. As described above, the properties of the seal can be greatly affected by the elements used to create the alloy. Additionally, metal alloys comprising the same base elements can have different properties depending on the amount of each element present in the alloy.

The shape memory material described herein can be designed in any shape to fit any tool. For example, the shape memory material can be used as a sealing material within a small space envelope between two portions of a tool assembly, or the shape memory metal can be used as a force member to couple multiple portions of a tool assembly together. The shape memory material can be configured to transition between a first state and a second state when exposed to external stimuli. The transition can include any change in one or more dimensions, such as a change in length, width, and height. The change in dimension can result in a change in one or more of the surface area and cross-sectional shape of the material. Specifically, the shape memory material can be configured to expand or contract, depending on the needs of the project. In at least one example, the first state can be a contracted state and the second state can be an expanded state. The transition between the first state and the second state causing an expansion of the material in one or more dimension (e.g., when the shape memory material expands along the vertical axis, it can correspondingly shrink along the horizontal axis, or vice versa). In an alternative example, the first state can be an expanded state and the second state can be a contracted state. The transition between the first state and the second state causing a decrease in one or more dimension.

The metal-to-metal seals made in accordance with the present disclosure can provide increased seal capability within downhole tools. A sealing material as described herein can used in conjunction with various elements in order to produce a seal capable of withstanding both internal and external extreme pressures. In at least one embodiment, such pressures can be from about 15,000 psi to about 30,000 psi; in an alternative embodiment, the pressures can be greater than 15,000 psi; greater than 30,000 psi; and in yet another embodiment the pressures may be significantly greater than 30,000 psi without fracturing or failing.

The metal-to-metal seals described herein can be used in connection with a tool 200 deployed in an exemplary wellbore system 100 shown, for example, in FIG. 1. A system 100 for using a tool 200 encompassing the metal-to-metal seal can include a drilling rig 110 extending over and around a wellbore 120. The wellbore 120 is drilled within an earth formation 150 and can have a casing 130 lining the wellbore 120, the casing 130 held into place by cement 122. A downhole tool assembly 200 can be lowered into the wellbore 120 via a conveyance 140 to a desired location. A conveyance can be, for example, tubing-conveyed, coiled tubing, joint tubing, or other tubulars, completion string, wireline, slickline, work string, or any other suitable means for conveying tools into a wellbore. The tool 200 may be any downhole tool which requires a seal to prevent fluid from leaking out of or within the tool, to prevent downhole environmental fluid from entering the tool, and other similar complications. Such tools can include, but are not limited to, modular tools having removable and replaceable portions. Downhole tools compatible with the disclosed seal can include, but are not limited to, logging tools, measuring tools, telemetry tools, perforation tools, completion tools (e.g. in an intelligent completion tools using production tubing), retrieval or actuation tools, or any other type of tool which may require metal-to-metal seals.

Modifications, additions, or omissions may be made to FIG. 1 without departing from the spirit and scope of the present disclosure. For example, FIG. 1 depicts components of the wellbore operating environment 100 in a particular configuration. However, any suitable configuration of components may be used. Furthermore, fewer components or additional components beyond those illustrated may be included in the wellbore operating environment 100 without departing from the spirit and scope of the present disclosure. It should be noted that while FIG. 1 generally depicts a land-based operation, those skilled in the art would readily recognize that the principles described herein are equally applicable to operations that employ floating or sea-based platforms and rigs or sub-sea, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

The following illustrates exemplary methods for creating one or more metal-to-metal seals as described herein. The examples are not intended to limit the scope of the present disclosure and should not be so interpreted.

Downhole equipment can be modular such that portions of a downhole tool body can be removed and replaced to create different tools, such that the same tool body can be used for several different tasks. In assembling such modular tools, seals may be required to prevent leakage between modules. In practice, these seals can become damaged as modules are slid in and out of place, fracturing, cracking, or deforming the metal-to-metal seal as the material contacts other surfaces. In at least one example, the metal-to-metal shape memory seal described herein can be used in a small space envelope to create a seal within a modular downhole tool.

Figure 2:
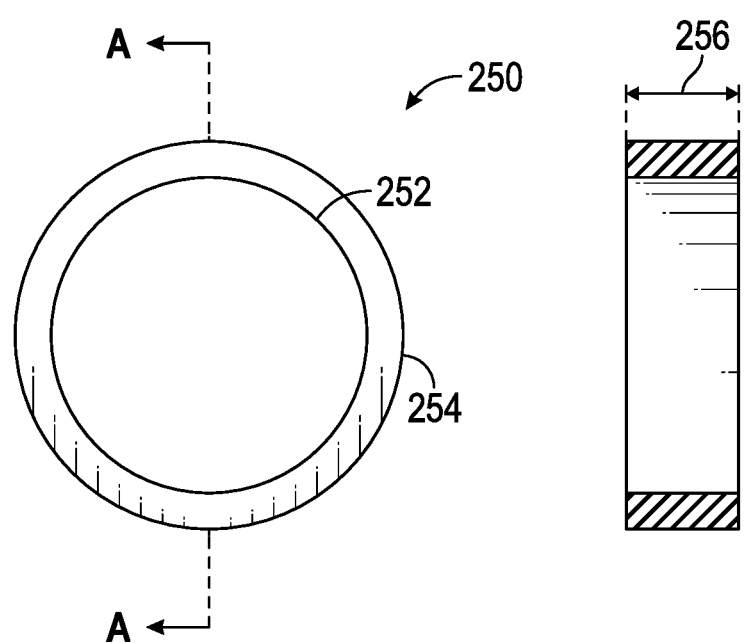
FIG. 2 is a diagram illustrating an exemplary shrink ring.

For purposes of this example only, the shape memory sealing material is made of a nickel titanium alloy and formed into a ring 250 which can be disposed within a modular tool. A shape memory ring 250 in accordance with this example is illustrated in FIG. 2. The ring 250 can have a first state having a first internal circumference 252, a first external circumference 254, and a first height 256. The ring 250 can have a second state having a second internal circumference, a second external circumference, and a second height. Depending on the needs of the tool assembly, the second internal circumference and second external circumference can be essentially the same or different than the first internal circumference and the first external circumference. In the alternative, the second height can be the same or different than the first height. In at least one example, the ring 250 can be configured such that the crystalline structure of the material changes from the first state to the second state in response to an external stimuli such as an increase in temperature. While the ring 250 illustrated in FIG. 2 has smooth surfaces on all sides, in alternative examples the surface of the seal can include grooves or peaks to increase the efficiency of the pressure seal. For example, the ring seal can include a peak on both the top and bottom surfaces to provide for a stronger metal-to-metal seal.

Figure 3A:
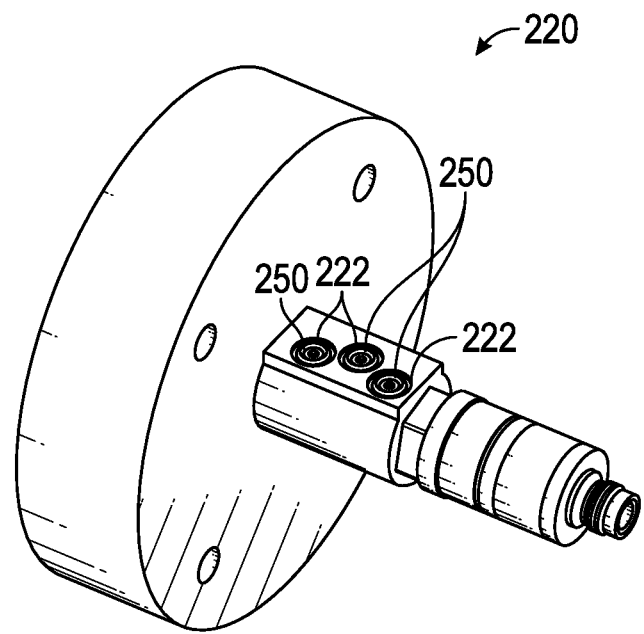
FIG. 3A is a diagram of a test fixture illustrating a part of a downhole tool joint that is compatible with the metal-to-metal seals described herein.
Figure 3B:
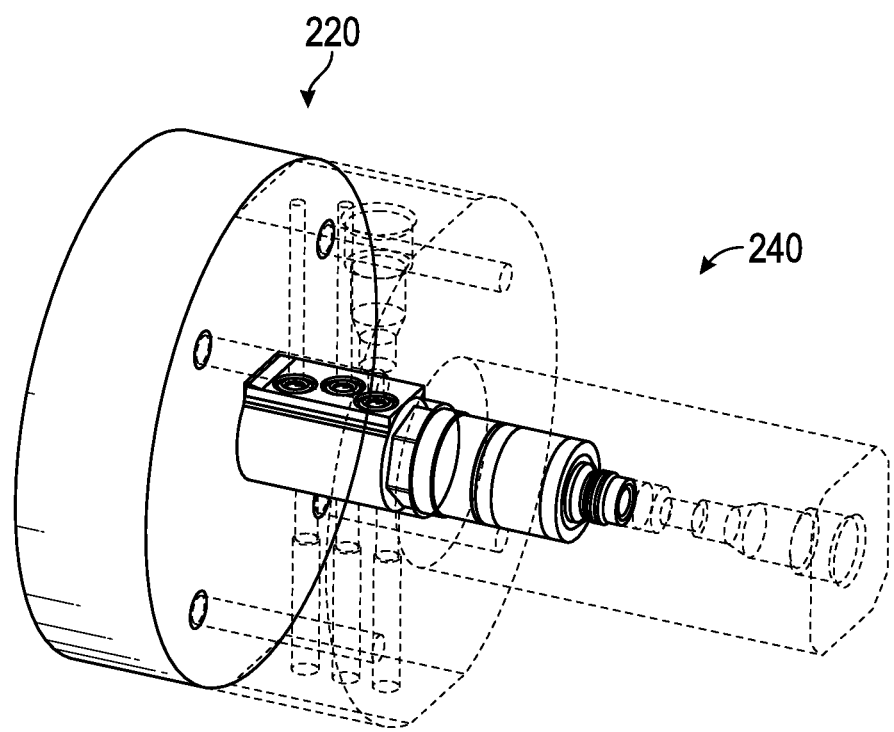
FIG. 3B is a diagram of a test fixture illustrating a downhole tool compatible with the metal-to-metal seals described herein.

As shown in FIG. 3A, the ring 250 can be placed within a recess 222, such as a seal carrier groove, of a first metal component 220. While FIG. 3A indicates the presence of three recesses 222 and three rings 250 any number of rings 250 may be used, depending on the design of the first component 220. As illustrated, the ring 250 can be configured such that when in the first state the height of the ring 250 is smaller than the depth of the recess 222. In such a configuration, the ring 250 does not contact any surface other than the recess 222 of the first component 220, allowing the first component 220 to be moved in and out of a tool without causing damage to the seal. For example, the first component 220 can be coupled with a second metal component 240, as illustrated in FIG. 3B, aligning the ring 250 with ports in the second component 240. The second component 240 can be a mating component, complementary to the first component 220.

Once the first component 220 is coupled with the mating component 240, the ring 250 can be exposed to external stimuli causing the material to undergo crystalline rearrangement resulting in the second state. For example, the first state of the ring 250 can be a martensite crystalline structure having a first height smaller than the depth of the recess 222 of the first component 220 and the second state can be an austenite crystalline structure, which can have a second height larger than the depth of the recess 222, such that when in the second state multiple high-pressure metal-to-metal seals are created. For example, a first metal-to-metal seal is created between the first component 220 and the ring 250, and a second metal-to-metal seal is created between the mating component 240 and the ring 250. In at least one example, the external stimuli can be heating the ring 250 to a predetermined temperature. The temperature required to cause the material to transition from the first state to the second state is material dependent. In at least some examples the transition temperature can be as low as temperatures just above cryogenic temperatures (e.g., −120° C. or lower); in other examples the transition temperature can be as high as about 300° C. The temperature at which the transition takes place is highly alloy dependent, for example, some shape memory alloys can transition at temperatures between cryogenic temperatures and room temperature, some can transition at temperatures above room temperature, and some can have a significantly higher transition temperature. While Example 1 indicates that the ring itself is heated to the transition temperature, any portion, or the entirety, of the tool could be heated as long as the shape memory material reached the transition temperature in order to allow the shape memory material to undergo crystalline rearrangement. The metal-to-metal seals created by the shape memory material as described can withstand extreme pressures. Such pressure levels can vary significantly depending on the shape memory as well as the environmental temperatures.

While the present example describes a change in crystalline structure that causes a change in height or thickness of the ring it should be obvious to those having skill in the art that the shape memory seal could be designed to expand or contract along any axis in order to achieve the desired effect.

In at least one example, once the metal-to-metal seals are created, the ring will remain in the second state until exposed to sub-zero temperatures. For modular tools, if disassembly is desired, the shape memory material can be cooled to sub-zero temperatures, allowing the ring to return to the first state and the first component to be removed from the mating component. In an alternative example, the ring seal can be a permanent means of sealing the first component to the mating component and can be maintained in the second state throughout the life of the tool.

In at least one example, point load sealing features can be added to either the shape memory seal material or the mating surfaces of the first component and the mating component in order to reduce the area of contact and create a higher pressure seal.

While the previous example includes a seal which expands from the first state to the second state in order to contact both components, it would be obvious to those having skill in the art that the shape memory seal could be configured to only contact one of the metal components in either the expanded or the contracted state.

Downhole tools used in wellbore operations are subjected to extreme environments, not only with respect to excessive temperatures and pressures, but also with respect to corrosive fluids found a downhole, such as hydrogen sulfide. Some shape memory materials can be susceptible to cracking or erosion when exposed to these corrosive downhole fluids. In order to prolong the useful life of the shape memory material, the metal-to-metal seals can be designed to protect the shape memory material from the external environment, an example of which is illustrated in each of FIGS. 4A and 4B.

Figure 4A:
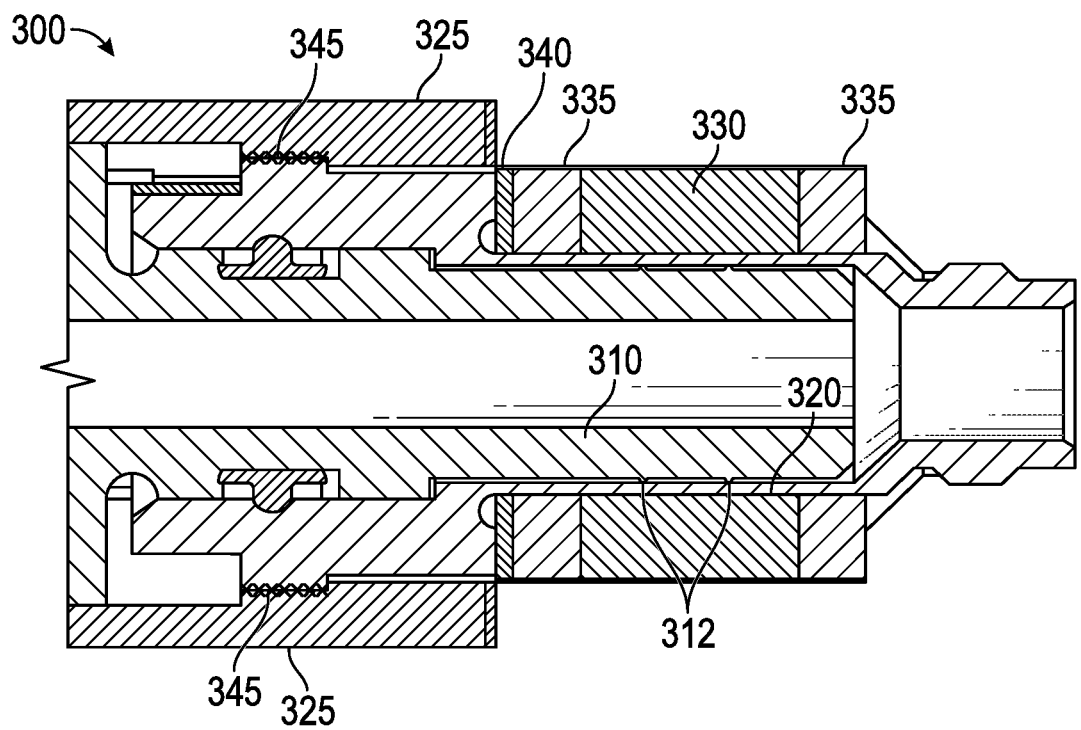
FIG. 4A is a diagram illustrating an exemplary downhole tool assembly compatible with the metal-to-metal seals described herein.

FIG. 4A illustrates an exemplary metal-to-metal seal within a downhole tool assembly 300 wherein a thin sleeve 320 is used to isolate the shape-memory alloy ring seal 330 from the downhole environment and to form part of the metal-to-metal seal when the shape memory alloy ring is activated. In this example, downhole tool assembly 300 can include a mating component 310, a thin sleeve 320, and a shape memory shrink ring 330. The shape memory ring 330 can be placed around the thin sleeve 320; the thin sleeve 320 can then be disposed about the mating component 310. In at least one embodiment, a washer 340 can be included in order to slow the heat transfer from the weld points 345 to the shape memory ring 330. Additionally, in at least one embodiment, one or more spacers 335 can be included on either side of the shape memory ring 330 to provide support for the thin sleeve 320 and reduce movement of the thin sleeve 320 within the downhole tool assembly 300. Such spacers 335 can be of any suitable supportive material including, but not limited to, a metal with a low thermal conductivity such as beryllium copper (BeCu). The thin sleeve 320 can be either removably or irremovably coupled to the outer component 325 by any suitable means. In at least one example, the thin sleeve 320 can be welded 345 to the outer component 325 such that the two pieces allow for a fluid-tight seal. The mating component 310 can include one or more protrusions 312 which can be configured to act as metal-to-metal sealing points against the thin sleeve 320.

The downhole tool assembly 300 can then be subjected to external stimuli, such as increased temperature, in order to create crystalline rearrangement of the shape memory shrink rink 330. For example, the shape memory shrink ring 330 can begin in a first state, wherein the shrink ring 330 has a first internal diameter, and transition into a second state when subjected to a predetermined temperature, wherein the second state has a second internal diameter smaller than that of the first internal diameter (e.g., the shape memory shrink ring decreases in size circumferentially). As the shape memory shrink ring 330 transitions to the second state, the shrink ring 330 can compress the thin sleeve 320 such that the sleeve is forced against the mating component 310 and the one or more protrusions 312 to create a high-pressure metal-to-metal seal. In this example, the shrink ring 330 provides the necessary force to create a metal-to-metal seal between the thin sleeve 320 and the mating component 310.

The degree of deformation of the shape memory shrink ring 330 can be designed based on the elemental composition of the shape memory alloy used to create the shrink ring as well as its starting size, as described in detail above. For example, a shape memory alloy can be selected to achieve a desired load sufficient to keep the thin sleeve 320 in contact with the one or more protrusions 312, even when the downhole tool assembly 300 is subjected to extreme pressures downhole.

While FIG. 4A illustrates a shape memory shrink ring 330 that has a smooth surface, the shape memory shrink ring can be designed to have any surface contours desired, or deemed beneficial, based on the design of the downhole tool assembly 300. For example, the shape memory shrink ring and mating component can be designed such that a tongue-and-groove coupling is created within the downhole tool assembly 300.

In at least one embodiment, the pressure the shape memory shrink rink 330 exerts on the thin sleeve 320 is sufficient to maintain a seal when subjected to high-pressures (for example, pressures in excess of 20,000 psi), but low enough that the mating component 310 can be removed from the downhole tool assembly 300 if desired.

Figure 4B:
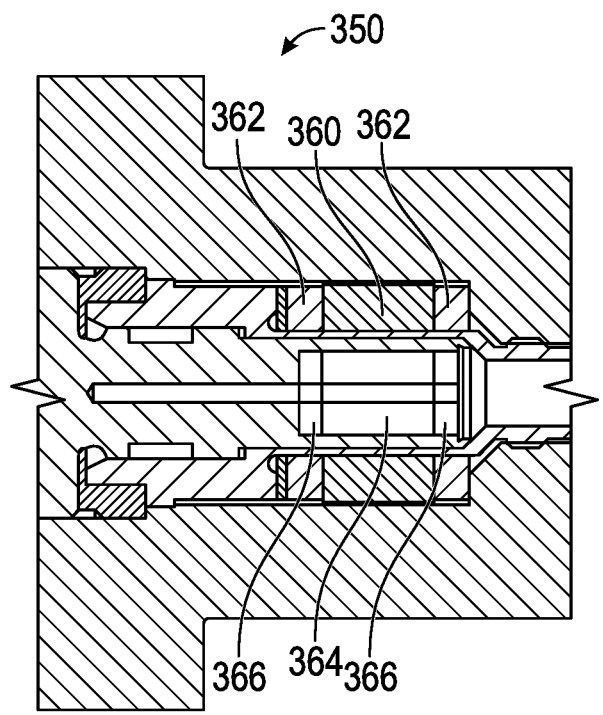
FIG. 4B is a diagram illustrating an alternative exemplary downhole tool assembly compatible with the metal-to-metal seals described herein.

FIG. 4B illustrates an alternative use of the disclosed metal-to-metal seal within a downhole tool assembly 350. As indicated in FIG. 4B, two shape memory rings 360, 364 can be provided within the downhole tool assembly 350. In at least one embodiment, the larger of the shape memory rings (e.g., 360) can be configured to contract when heated and the smaller of the shape memory rings (e.g., 364) can be configured to expand when heated. Providing multiple shape memory rings can allow for an increase in contact force and improved seal, this arrangement can allow for the seal to hold even against increased pressures. As described with respect to FIG. 4A, the shape memory rings (360,364) provide the necessary force to create a metal-to-metal seal between internal tool components. As described in detail above, each individual shape memory ring can be designed to generate and withstand varying forces depending on the materials used, the cross-sectional size and shape of the shape memory alloy, as well as several other factors. As described above with respect to FIG. 4A, the downhole tool assembly 350 can have additional components, such as spacers 362, 366, in order to assist in securing the assembly.

As discussed in detail above, the materials and parameters of the shape metal shrink ring can be adjusted based on the desired applications and designs. While the previous example includes a seal which contracts from the first state to the second state in order to contact only one metal component, it would be obvious to those having skill in the art that the shape memory seal could be configured to contact both metal components in the contracted state.

While each of the above examples describe the shape memory material being heated to a predetermined temperature to induce the transition between the first state and the second state, it should be obvious to those having skill in the art that any other suitable means of inducing transition in a shape memory material could be used. Additionally, the transition of the shape memory material from the first state to the second state to create the metal-to-metal seal can be done at any time including prior to being disposed downhole as well as after being disposed downhole.

Numerous examples are provided herein to enhance understanding of the present disclosure. A specific set of statements are provided as follows.

Statement 1: A seal comprising a first metal component; a second metal component couplable with the first metal component; and a shape memory alloy having a first state and a second state, the first state and the second state being different in at least one dimension, wherein in response to an external stimulus, the shape memory alloy transitions in one or more dimension from the first state to the second state thereby forming at least one metal-to-metal seal.

Statement 2: A seal according to Statement 1, wherein the first state of the shape memory alloy is a contracted state, the second state of the shape memory alloy is an expanded state, and wherein the shape memory alloy expands from the first state to the second state.

Statement 3: A seal according to Statement 1 or Statement 2, wherein when the shape memory alloy is in the expanded state the shape memory alloy abuts both the first metal component and the second metal component.

Statement 4: A seal according to any one of Statements 1-3, wherein when the shape memory alloy is in the expanded state the shape memory alloy abuts only one of the first metal component or the second metal component.

Statement 5: A seal according to any one of Statements 1-4, wherein the first state of the shape memory alloy is an expanded state, the second state of the shape memory alloy is a contracted state, and wherein the shape memory alloy contracts from the first state to the second state.

Statement 6: A seal according to any one of Statements 1-5, wherein when the shape memory alloy is in the contracted state the shape memory alloy abuts both the first metal component and the second metal component.

Statement 7: A seal according to any one of Statements 1-6, wherein when the shape memory alloy is in the contracted state the shape memory alloy abuts only one of the first metal component or the second metal component.

Statement 8: A seal according to any one of Statements 1-7, wherein the shape memory alloy comprises two or more elements, the elements of the shape memory alloy are selected from the group consisting of nickel, titanium, copper, aluminum, iron, manganese, silicon, and zinc.

Statement 9: A seal according to any one of Statements 1-8, wherein the shape memory alloy is selected from the group consisting of a nickel-titanium alloy, a copper-aluminum-nickel alloy, an iron-manganese-silicon alloy, and a copper-zinc-aluminum alloy.

Statement 10: A seal according to any one of Statements 1-9, wherein the shape memory alloy is disposed within a space envelope created between the mating surfaces of the first metal component and the second metal component, and wherein when the shape memory alloy transitions from the first state to the second state the shape memory alloy expands to fill the space envelope.

Statement 11: A seal according to any one of Statements 1-10, wherein the shape memory alloy is disposed about both of the first metal component and the second metal component, and wherein when the shape memory alloy transitions from the first state to the second state the shape memory alloy contracts, compressing the first metal component and the second metal component on to the other.

Statement 12: A seal according to any one of Statements 1-11, wherein the shape memory alloy is disposed within the first metal component which is disposed within the second metal component, and wherein when the shape memory alloy transitions from the first state to the second state the shape memory alloy expands, pressing the first metal component into the second metal component.

Statement 13: A seal according to any one of Statements 1-12, wherein the at least one metal-to-metal seal includes a first metal-to-metal seal between the shape memory alloy and the first metal component and a second metal-to-metal seal between the shape memory alloy and the second metal component.

Statement 14: A seal according to any one of Statements 1-13, wherein the at least one metal-to-metal seal includes a first metal-to-metal seal between the first metal component and the second metal component.

Statement 15: A seal according to any one of Statements 1-14, wherein the transition in one or more dimension is selected from the group consisting of a length, a width, and a height.

Statement 16: A seal according to any one of Statements 1-15, further comprising a second shape memory alloy having a first state and a second state.

Statement 17: A seal according to any one of Statements 1-16, wherein one of the shape memory alloy and the second shape memory alloy is configured to expand when subjected to the external stimulus, and the other of the shape memory alloy and the second shape memory alloy is configured to contract when subjected to the external stimulus.

Statement 18: A seal according to any one of Statements 1-17, wherein the shape memory alloy and the second shape memory alloy are disposed in a concentric formation.

Statement 19: A seal according to any one of Statements 1-18, wherein the transition of the shape memory alloy from the first state to the second state includes a change in crystalline structure of the shape memory alloy.

Statement 20: A method of creating a seal comprising providing a downhole tool comprising a first metal component; a second metal component couplable with the first metal component; and a shape memory alloy having a first state and a second state, the first state and the second state being different in at least one dimension; arranging the first metal component, the second metal component, and the shape memory alloy such that when the shape memory alloy transitions in one or more dimension from the first state to the second state at least one metal-to-metal seal is formed; and subjecting the shape memory alloy to an external stimulus to induce the transition from the first state to the second state.

Statement 21: A method according to Statement 20, wherein the external stimulus is selected from the group consisting of a change in temperature, a change in pressure, an electrical charge, a sonic input, and combinations thereof.

Statement 22: A method according to any one of Statement 20 or Statement 21, wherein the arranging step further comprises inserting the first metal component into the second metal component; and disposing the shape memory alloy about the second metal component, wherein when the shape memory alloy transitions from the first state to the second state the shape memory alloy contracts, creating a first metal-to-metal seal between the first metal component and the second metal component.

Statement 23: A method according to any one of Statements 20-22, wherein the arranging step further comprises placing the shape memory alloy in a space envelope formed in the surface of the first metal component; and inserting the first metal component into a receiving portion of the second metal component, wherein when the shape memory alloy transitions from the first state to the second state the shape memory alloy expands forming a first metal-to-metal seal between the first metal component and the shape memory alloy and a second metal-to-metal seal between the second metal component and the shape memory alloy.

Statement 24: A method according to any one of Statements 20-23, wherein the shape memory alloy comprises two or more metals, the elements of the shape memory alloy are selected from the group consisting of nickel, titanium, copper, aluminum, iron, manganese, silicon, and zinc.

Statement 25: A method according to any one of Statements 20-24, wherein the shape memory alloy is selected from the group consisting of a nickel-titanium alloy, a copper-aluminum-nickel alloy, an iron-manganese-silicon alloy, and a copper-zinc-aluminum alloy.

Statement 26: A method according to any one of Statements 20-25, further comprising subjecting the shape memory alloy to a second external stimulus to transition the shape memory alloy from the second state back to the first state.

Statement 27: A method according to any one of Statements 20-26, wherein the transition in one or more dimension is selected from the group consisting of a length, a width, and a height.

Statement 28: A method according to any one of Statements 20-27, further comprising a second shape memory alloy having a first state and a second state.

Statement 29: A method according to any one of Statements 20-28, wherein one of the shape memory alloy and the second shape memory alloy is configured to expand when subjected to the external stimulus, and the other of the shape memory alloy and the second shape memory alloy is configured to contract when subjected to the external stimulus.

Statement 30: A method according to any one of Statements 20-29, wherein the shape memory alloy and the second shape memory alloy are disposed in a concentric formation.

Statement 31: A method according to any one of Statements 20-30, wherein the transition of the shape memory alloy from the first state to the second state includes a change in crystalline structure of the shape memory alloy.

Statement 32: A system comprising a downhole tool sized to be disposed within a wellbore, the downhole tool comprising a first metal component; a second metal component complementary to the first metal component; and a shape memory alloy having a first state and a second state, the first state and the second state being different in at least one dimension, wherein in response to an external stimulus, the shape memory alloy transitions in one or more dimension from the first state to the second state thereby forming at least one metal-to-metal seal.

Statement 33: A system according to Statement 32, wherein the first state of the shape memory alloy is a contracted state, the second state of the shape memory alloy is an expanded state, and wherein the shape memory alloy expands from the first state to the second state.

Statement 34: A system according to any one of Statement 32 or Statement 33, wherein when the shape memory alloy is in the expanded state the shape memory alloy abuts both the first metal component and the second metal component.

Statement 35: A system according to any one of Statements 32-34, wherein when the shape memory alloy is in the expanded state the shape memory alloy abuts only one of the first metal component or the second metal component.

Statement 36: A system according to any one of Statements 32-35, wherein the first state of the shape memory alloy is an expanded state, the second state of the shape memory alloy is a contracted state, and the shape memory alloy contracts from the first state to the second state.

Statement 37: A system according to any one of Statements 32-36, wherein when the shape memory alloy is in the contracted state the shape memory alloy abuts both the first metal component and the second metal component.

Statement 38: A system according to any one of Statements 32-37, wherein when the shape memory alloy is in the contracted state the shape memory alloy abuts only one of the first metal component or the second metal component.

Statement 39: A system according to any one of Statements 32-38, wherein the external stimulus is selected from the group consisting of a change in temperature, a change in pressure, an electrical current, a sonic input, and combinations thereof.

Statement 40: A system according to any one of Statements 32-39, wherein the shape memory alloy comprises two or more metals, the elements of the shape memory alloy are selected from the group consisting of nickel, titanium, copper, aluminum, iron, manganese, silicon, and zinc.

Statement 41: A system according to any one of Statements 32-40, wherein the shape memory alloy is selected from the group consisting of a nickel-titanium alloy, a copper-aluminum-nickel alloy, an iron-manganese-silicon alloy, and a copper-zinc-aluminum alloy.

Statement 42: A system according to any one of Statements 32-41, wherein the transition in one or more dimension is selected from the group consisting of a length, a width, and a height.

Statement 43: A system according to any one of Statements 32-42, further comprising a second shape memory alloy having a first state and a second state.

Statement 44: A system according to any one of Statements 32-43, wherein one of the shape memory alloy and the second shape memory alloy is configured to expand when subjected to the external stimulus, and the other of the shape memory alloy the second shape memory alloy is configured to contract when subjected to the external stimulus.

Statement 45: A system according to any one of Statements 32-44, wherein the shape memory alloy and the second shape memory alloy are disposed concentrically around one another.

Statement 46: A system according to any one of Statements 32-45, wherein the at least one metal-to-metal seal includes a first metal-to-metal seal between the shape memory alloy and the first component and a second metal-to-metal seal between the shape memory alloy and the second metal component.

Statement 47: A system according to any one of Statements 32-46, wherein the at least one metal-to-metal seal includes a first metal-to-metal seal between the first metal component and the second metal component.

Statement 48: A system according to any one of Statements 32-47, wherein the transition of the shape memory alloy from the first state to the second state includes a change in crystalline structure of the shape memory alloy.

Statement 49: A downhole component comprising a downhole tool sized to be disposed within a wellbore, the downhole tool comprising at least a first metal component and a second metal component complementary to the first metal component; and a shape memory alloy having a first state and a second state, the first state and the second state being different in at least one dimension, wherein in response to an external stimulus, the shape memory alloy transitions in one or more dimension from the first state to the second state thereby forming at least one metal-to-metal seal, wherein the shape memory alloy is shaped to couple a surface of both the first metal component and the second metal component.

Statement 50: A downhole component according to Statement 49, wherein the first state of the shape memory alloy is a contracted state, the second state of the shape memory alloy is an expanded state, and wherein the shape memory alloy expands from the first state to the second state.

Statement 51: A downhole component according to Statements 49 or Statement 50, wherein the first state of the shape memory alloy is an expanded state, the second state of the shape memory alloy is a contracted state, and wherein the shape memory alloy contracts from the first state to the second state.

Statement 52: A downhole component according to any one of Statements 49-51, wherein the shape memory alloy is in contact with one of the first metal component or the second metal component.

Statement 53: A downhole component according to any one of Statements 49-52, wherein the at least one metal-to-metal seal includes a first metal-to-metal seal between the first metal component and the second metal component.

Statement 54: A downhole component according to any one of Statements 49-53, wherein the shape memory alloy is in contact with both the first metal component and the second metal component.

Statement 55: A downhole component according to any one of Statements 49-54, wherein the at least one metal-to-metal seal includes a first metal-to-metal seal between the shape memory alloy and the first component and a second metal-to-metal seal between the shape memory alloy and the second metal component.

Statement 56: A downhole component according to any one of Statements 49-54, wherein the external stimulus is selected from the group consisting of a change in temperature, a change in pressure, an electrical current, a sonic input, and combinations thereof.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A seal comprising:
  a sleeve that includes a first portion and a second portion;
  a mating component couplable with the sleeve based on the first portion of the sleeve surrounding at least part of the mating component; and
  a shape memory alloy disposed at a surface of the sleeve, the shape memory alloy having a first state and a second state, the first state and the second state being different in at least one dimension, wherein in response to an external stimulus, the shape memory alloy transitions in one or more dimensions from the first state to the second state; and
  an outer component that is welded to the second portion of the sleeve to isolate the shape memory alloy from an external environment, wherein the transition of the shape memory alloy to the second state leads to formation of at least one metal-to-metal seal between the first portion of the sleeve and the mating component in response to the external stimulus.

2. The seal of claim 1, wherein the first state of the shape memory alloy is a contracted state, the second state of the shape memory alloy is an expanded state, and wherein the shape memory alloy expands from the first state to the second state.

3. The seal of claim 1, wherein the first state of the shape memory alloy is an expanded state, the second state of the shape memory alloy is a contracted state, and wherein the shape memory alloy contracts from the first state to the second state.

4. The seal of claim 1, wherein the shape memory alloy comprises two or more elements, the elements of the shape memory alloy are selected from the group consisting of nickel, titanium, copper, aluminum, iron, manganese, silicon, and zinc.

5. The seal of claim 4, wherein the shape memory alloy is selected from the group consisting of a nickel-titanium alloy, a copper-aluminum-nickel alloy, an iron-manganese-silicon alloy, and a copper-zinc-aluminum alloy.

6. The seal of claim 1, wherein the sleeve includes or a second shape memory alloy.

7. A method of creating a seal comprising:
providing a downhole tool comprising:
a sleeve that includes a first portion and a second portion;
a mating component couplable with the sleeve based on the first portion of the sleeve surrounding at least part of the mating component;
a shape memory alloy disposed at a surface of the sleeve, the shape memory alloy having a first state and a second state, the first state and the second state being different in at least one dimension; and
an outer component;
arranging the sleeve, the mating component, the shape memory alloy, and the outer component;
welding the outer component to the second portion of the sleeve to isolate the shape memory alloy from an external environment, wherein the shape memory alloy transitions in one or more dimensions from the first state to the second state when at least one metal-to-metal seal is formed between the first portion of the sleeve and the mating component; and
subjecting the shape memory alloy to an external stimulus to induce the transition from the first state to the second state.

8. The method of claim 7, wherein the external stimulus is selected from the group consisting of a change in temperature, a change in pressure, an electrical charge, a sonic input, and combinations thereof.

9. The method of claim 7, wherein the arranging step further comprises:
inserting the mating component into the sleeve;
disposing the shape memory alloy about the sleeve, wherein when the shape memory alloy transitions from the first state to the second state the shape memory alloy contracts to form the at least one metal-to-metal seal.

10. The method of claim 7, wherein the arranging step further comprises:
placing the shape memory alloy in a space envelope formed in the surface of the sleeve; and
inserting the mating component into a receiving portion of the sleeve wherein when the shape memory alloy transitions from the first state to the second state the shape memory alloy expands when the at least one metal-to-metal seal is formed.

11. The method of claim 7, wherein the shape memory alloy comprises two or more elements selected from the group consisting of nickel, titanium, copper, aluminum, iron, manganese, silicon, and zinc.

12. The method of claim 11, wherein the shape memory alloy is selected from the group consisting of a nickel-titanium alloy, a copper-aluminum-nickel alloy, an iron-manganese-silicon alloy, and a copper-zinc-aluminum alloy.

13. The method of claim 7, further comprising subjecting the shape memory alloy to a second external stimulus to transition the shape memory alloy from the second state back to the first state.

14. A downhole component comprising:
a downhole tool sized to be disposed within a wellbore, the downhole tool comprising at least a sleeve and a mating complementary to the sleeve;
a shape memory alloy disposed at a surface of the sleeve, the shape memory alloy having a first state and a second state, the first state and the second state being different in at least one dimension, wherein in response to an external stimulus, the shape memory alloy transitions in one or more dimensions from the first state to the second state; and
an outer component, wherein the outer component is welded to the sleeve to isolate the shape memory alloy from an external environment, and the transition of the shape memory alloy to the second state leads to formation of forming at least one metal-to-metal seal between the sleeve and the mating component.

15. The downhole component of claim 14, wherein the sleeve includes a second shape memory alloy.

16. The downhole component of claim 14, wherein the at least one metal-to-metal seal includes a first metal-to-metal seal between the shape memory alloy and the sleeve and a second metal-to-metal seal between the shape memory alloy and the mating component.

17. The downhole component of claim 14, wherein the external stimulus is selected from the group consisting of a change in temperature, a change in pressure, an electrical current, a sonic input, and combinations thereof.

18. The seal of claim 1, wherein the at least one metal-to-metal seal includes a first metal-to-metal seal between the shape memory alloy and the sleeve and a second metal-to-metal seal between the shape memory alloy and a metal component.

19. The method of claim 7, wherein the shape memory alloy is in contact with one of the sleeve or a metal component of the downhole tool.

20. The downhole component of claim 14, wherein the shape memory alloy is in contact with both the sleeve and a metal component.

* * * * *